United States Patent [19]

Shipp

[11] Patent Number: 5,717,306

[45] Date of Patent: Feb. 10, 1998

[54] BATTERY IDENTIFICATION AND POWER INTERRUPT SYSTEM

[76] Inventor: John I. Shipp, 104 Short Springs Rd., Tullahoma, Tenn. 37388

[21] Appl. No.: 342,382

[22] Filed: Nov. 18, 1994

[51] Int. Cl.[6] .................................................. H01M 10/46
[52] U.S. Cl. ........................................... 320/2; 320/48
[58] Field of Search ............................. 320/2, 15, 20, 320/30, 39, 48; 429/90

[56] References Cited

U.S. PATENT DOCUMENTS

| | | | |
|---|---|---|---|
| 4,593,409 | 6/1986 | Miller | 320/48 X |
| 4,734,896 | 3/1988 | Soma et al. | 340/568 |
| 4,746,852 | 5/1988 | Martin | 320/20 |
| 4,849,682 | 7/1989 | Bauer et al. | 320/15 |
| 4,965,738 | 10/1990 | Bauer et al. | 364/483 |
| 5,021,779 | 6/1991 | Bisak | 340/825 |
| 5,184,059 | 2/1993 | Patino et al. | 320/15 |
| 5,200,686 | 4/1993 | Lee | 320/2 |
| 5,206,097 | 4/1993 | Burns et al. | 429/90 |
| 5,237,257 | 8/1993 | Johnson et al. | 320/2 |
| 5,399,446 | 3/1995 | Takahashi | 429/90 |

OTHER PUBLICATIONS

Dallas Semiconductor Corp., Battery Identification Chip, 1993, pp. 21–23.
Dallas Semiconductor Corp., Silicon Serial Number, 1993, pp. 1–6.

*Primary Examiner*—Edward Tso
*Attorney, Agent, or Firm*—Waddey & Patterson; Mark J. Patterson

[57] ABSTRACT

A system for battery identification and interruption of power to a battery powered device includes a battery pack having an encoder in which battery identification data is digitally stored. A decoder incorporated in the battery powered device receives and processes battery identification data and compares it to preprogrammed device identification data.

10 Claims, 4 Drawing Sheets

5,717,306

BATTERY IDENTIFICATION AND POWER INTERRUPT SYSTEM

BACKGROUND OF THE INVENTION

The present invention relates generally to systems and methods for compatibility matching of a battery with a battery powered device. More specifically, the present invention pertains to battery packs with integral means for storage and external communication of a battery identification code which, in cooperation with decoder and power interrupt circuits in the battery powered device, prevents electrical operation of the device in the absence of a match between the battery identification code and a pre-programmed device identification code.

In conjunction with the evolution of semiconductor devices and integrated circuits, including the development of devices which are extremely small and relatively low in electrical power consumption, the use of batteries to power a variety of such devices has increased. Many battery powered devices have found their way into applications where insuring the compatibility of the battery to the device is critical. Examples would include the space and defense industries and in the biomedical technologies, including diagnostic and treatment devices which are implantable or otherwise used inside the body.

The criteria for battery and device compatibility in many applications goes beyond determining whether the battery is of the correct voltage. In most consumer products, this is done by manufacturing batteries in different mechanical packages whereby voltage and power capacity compatibility of the battery to the device is determined solely by conforming the battery size and shape to the battery enclosure in the device. This crude method of compatibility determination is not satisfactory where other criteria such as durability, battery capacity, voltage tolerance, performance under adverse environmental conditions, and the like, are important. Batteries of identical size and shape supplied by different manufacturers can vary widely in one or more of these important performance areas. Thus, there is a need for a system and method of identifying a battery by more specific criteria and for including means in a battery powered device for determining the battery identification and disabling electrical operation of that device if compatibility is not established.

There have been attempts in the prior art to develop battery packs and systems in which information is stored or encoded in the battery pack which is capable of being communicated externally to another device. For example, in U.S. Pat. No. 4,965,738 issued to Bauer, et al. on Oct. 23, 1990, a battery pack contains a processor which is capable of transmitting battery parameter data to an output port. This battery parameter data can then be used by a battery charger in order to determine whether and to what extent the battery needs to be charged. However, the intelligent battery system of the '738 patent does not contain a fixed battery identification code to insure compatibility with a powered device nor does it disclose a means in the battery powered device for interrogating the battery code and interrupting the power in response to an incompatibility determination.

U.S. Pat. No. 5,237,257 issued Aug. 17, 1993, to Johnson, et al. is similar, in that a battery type indicator is incorporated in the battery pack in the form of a passive electrical device, such as a resistor, and contacts are provided external to the battery pack whereby the value of the type-indicator component can be measured. Unfortunately, the use of passive electrical components to provide battery-type information is prone to error in that such components are subject to tolerance variations, aging and temperature variations, and to errors in the determination of their values by the interrogating circuits. Further, by relying on variations in analog electrical component values to determine various battery types, the number of battery types that can be included in the system is quite limited. Changing of the codes is also difficult. Further, the disclosure of the '257 patent pertains more directly to adjustment of battery charging systems in battery charging or electrical devices which include battery charging circuits. There is no teaching of the use of battery code information to interrupt electrical operation of the device if incompatibility is determined.

What is needed, then, is a system for encoding battery packs with specific identification data which can be decoded by an electrical powered device to ensure compatibility, and for interrupting electrical operation of the device in response to a determination of incompatibility. This device is presently lacking in the prior art.

SUMMARY OF THE INVENTION

An object of the present invention is to provide a means for preventing the operation of electrical devices in the absence of an exact match between a device identification code and a battery identification code communicated by a battery pack installed in the device.

A further object of the present invention is to provide a battery pack having a battery identification code which can be pre-programmed to convey specific information about the battery, including the date of manufacture, battery type, battery specifications, and the like.

Another object of the present invention is to provide for a battery identification coding system whereby a number of different codes can be pre-programmed in the battery pack and in the electrical device for which the battery pack is intended.

Yet another object of the present invention is to provide a power interrupt system in a battery powered electrical device which includes a decoder for interrogating battery identification data associated with an installed battery pack, for determining compatibility of that data with the electrical device, and for interrupting the power to the device in response to that comparison.

In accordance with these and other objects of the invention which will be apparent below, a battery identification and power interrupt system is provided in which a battery pack includes both an electrochemical or other storage cell and a battery encoder device containing programmed data which identifies that battery. In addition to conventional positive and negative electrical battery terminals attached to the battery pack enclosure, a data terminal is provided for allowing external interrogation of the battery encoder and for communication of the battery identification data to an electrical device in which the battery is installed.

A decoder within the electrically powered device interrogates the battery pack through the data terminal and decodes the battery identification code from the battery identification data signal provided by the battery encoder. The decoder means includes a memory module in which a pre-programmed device identification code is stored. A comparison is then made by the decoder of the battery identification code with the device identification code to insure proper match and compatibility. If a match is not obtained, an interrupt signal generator module within the decoder generates a power interrupt signal which is sent to a power interrupt device, preventing application of battery power to the system power supply of the device. The decoder can optionally include an input port for receiving an externally supplied device identification code so that the code associated with the device can be varied by the manufacturer. The decoder also includes modules capable of generating battery pack control signals to reset the battery encoder and provide for proper sequencing of data writing and reading to and from the encoder.

Preferably, error detection circuitry is also included with the decoder whereby, in highly critical applications, a determination can be made that the battery identification data received from the battery pack was free of transmission errors.

DESCRIPTION OF THE PREFERRED EMBODIMENT

Figure 1:
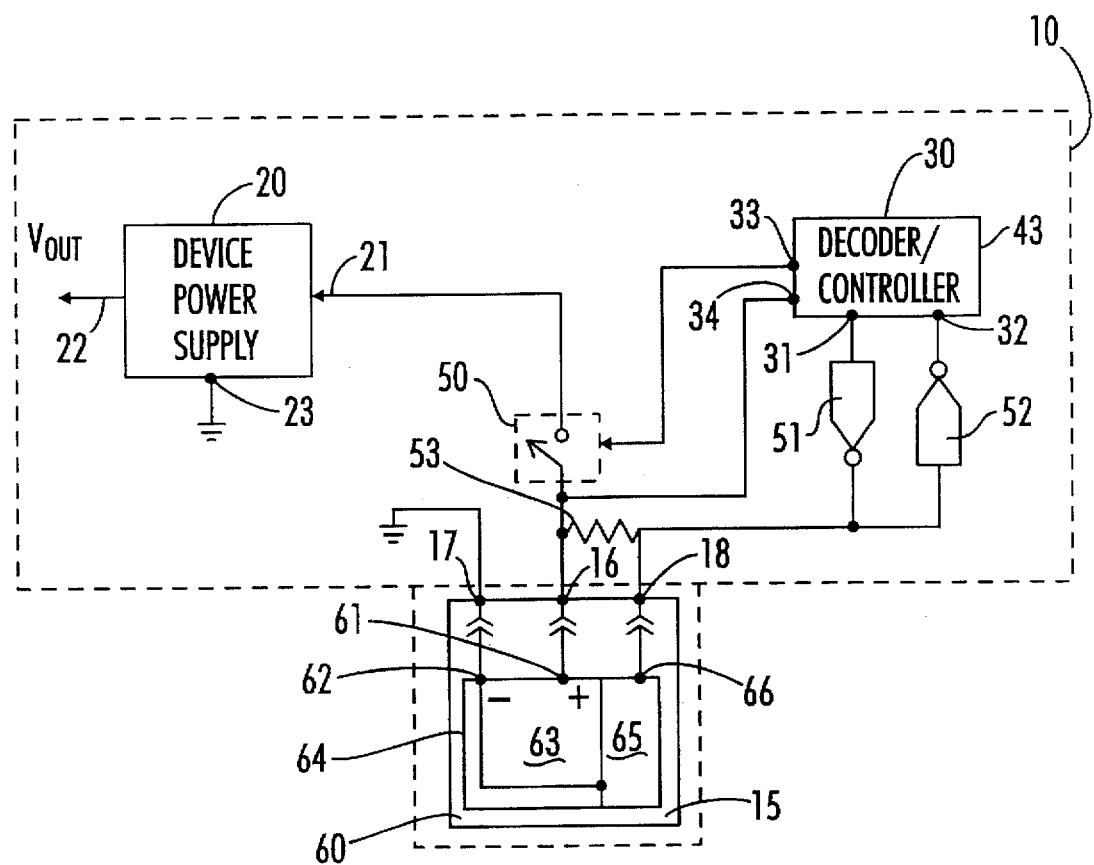
FIG. 1 is an electrical schematic and block diagram of the battery identification and power interrupt system of the present invention.

Looking first at FIG. 1, the general arrangement of the battery identification and power interrupt system is shown. A battery powered device 10 is the host for the components of the system. Device 10 can include a variety of functional circuits and devices which are not shown. Device 10 includes a conventional device power supply 20 which typically will convert the electrical voltage supplied by a battery at battery power input terminal 21 to the operational voltage or voltages required by device 10 and provide that converted voltage as $V_{OUT}$ at device power supply output terminal 22. Device power supply 20 will usually further include appropriate voltage regulators and filtering circuits, as needed by the performance characteristics of device 10.

Also, electrically and mechanically a part of device 10 is a battery housing 15 which can be formed in a wide variety of sizes and shapes as necessary to conform to the size and shape of battery or battery packs to be retained in housing 15.

The non-conventional elements of device 10 which form part of the system of the present invention are decoder/ control unit 30 and power interrupt switch 50. Decoder unit 30 provides the means for receiving and decoding battery identification data, for making the data and code comparisons necessary to insure battery compatibility, and for sending appropriate power interrupt signals to power interrupt switch 50, as will be described in more detail below.

Conventional positive and negative electrical contacts 16 and 17 are attached to battery housing 15 for purposes of making mechanical and electrical contact with corresponding positive and negative terminals 61 and 62 on a removable battery pack 60.

Positive and negative terminals 61 and 62 are physically attached to enclosure 64 of battery pack 60 and further make electrical connection to one or more battery cells 63 internal to battery pack 60. In accordance with a key feature of the system of the present invention, battery pack 60 further includes an integral battery encoder 65, which provides the means in battery pack 60 for the electrical storage of battery identification data, and for communicating that battery identification data externally through a data terminal 66 attached to battery pack enclosure 64. Accordingly, battery housing 15 further includes a data contact 18 which makes mechanical and electrical contact with battery pack data terminal 66 when the battery pack 60 is installed.

As further seen in FIG. 1, additional interface circuitry is provided within device 10 to insure proper functioning of the system as described below. Thus, negative terminal 62 of battery pack 60 will be electrically grounded to the ground side of device 10 through negative contact 17. Positive terminal 61 of battery pack 66 will be electrically connected to power interrupt switch 50 so that the flow of current to be supplied by battery pack 60 to device 10 can be enable or disabled in accordance with the functioning of power interrupt switch 50. Decoder 30 can receive its operational power directly from battery pack 60 through decoder power input 34 as shown on FIG. 1. Alternatively, decoder 30 can be provided with independent internal or external power. The communications between encoder unit 65 and decoder 30 are facilitated by electrical connection between battery housing data contact 18 and data output 31 and input 32 terminals of decoder 30 through data transmit line gate 51 and receive line gate 52. A pull-up resistor 53 electrically connects battery encoder 65 to the primary battery power line of device 10.

Although data terminal 66 and data contact 18 of a preferred embodiment of the system are shown as separate from their corresponding power terminals and contacts, it would be possible to combine the data terminal and contacts with a power terminal and superimpose the battery identification signals.

In a preferred embodiment of the system, the battery encoder 65 portion of battery pack 60 can be a Model DS2400 Silicon Serial Number integrated circuit manufactured by Dallas Semiconductor. In such an embodiment, all data communication to and from encoder 65 is accomplished by a single interface line, as shown on FIG. 1. Battery identification data stored in encoder 65 can then include an eight-bit digitally encoded model or type number and a forty-eight bit battery identification code. Encoder 65 in this embodiment can further include an eight-bit check value which can be used, as described below, to confirm that battery identification data from encoder 65 has been correctly received by the system.

The data stored in encoder 65 is accessed during read and write time slots, as shown on FIGS. 2a, 2b, 3a, and 3b, with power for encoder 65 being derived from high logic level pulses at the beginning of a write or read time slot.

Figure 6:
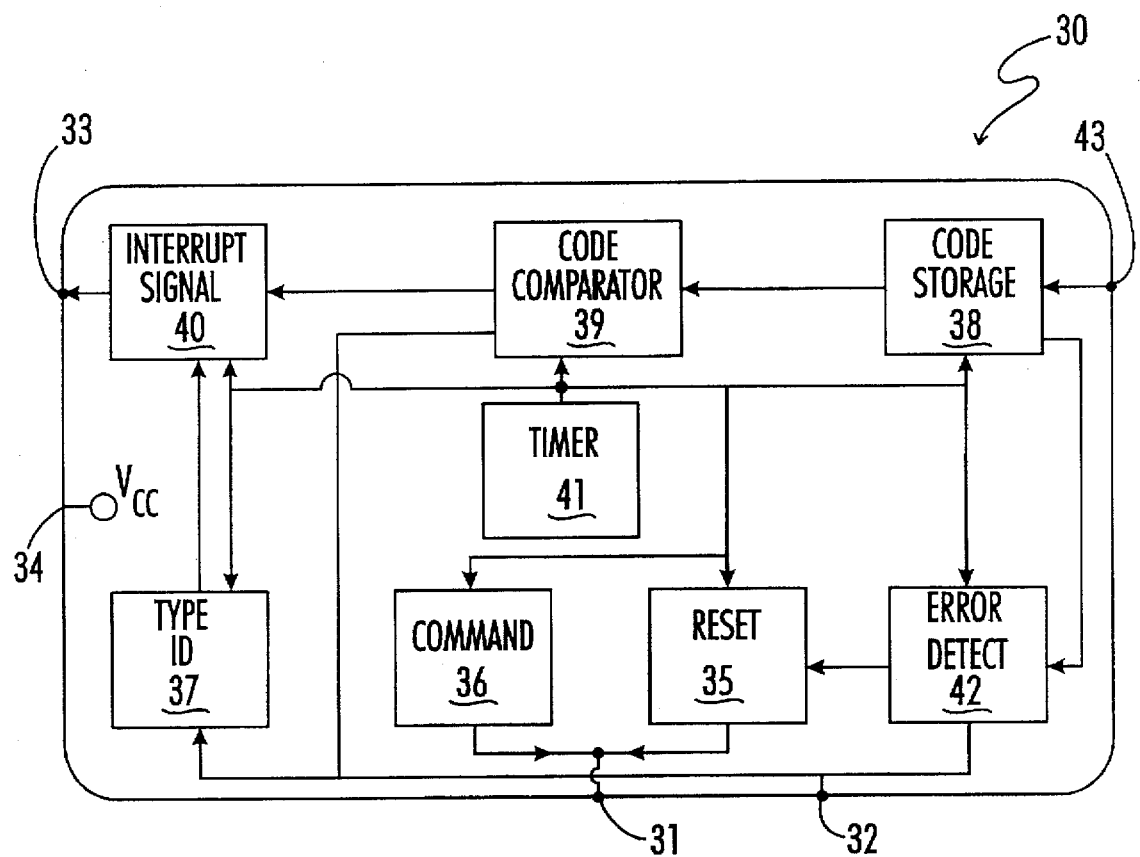
FIG. 6 is a block diagram representation of the decoder/controller unit of the system of the present invention.

To fully implement in the system of the present invention all the features available from encoder 65 of battery pack 60 as described above, a decoder/control 30 having functional modules which correspond to encoder 65 of the preferred embodiment is illustrated in more detail in FIG. 6. A timer circuit 41, which can be implemented in the form of a conventional programmable microprocessor, provides the various timing and logic signals in a conventional manner to other functional modules of decoder 30. These other modules can be physically separate from timer 41 or integral to it.

Figure 4:
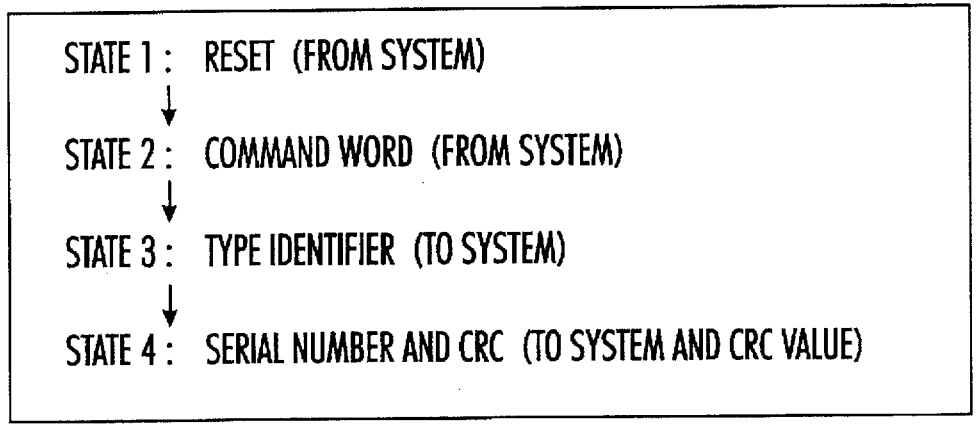
FIG. 4 is a table showing the sequence of states which are assumed by the battery encoder used in a preferred embodiment of the system.
Figure 5:
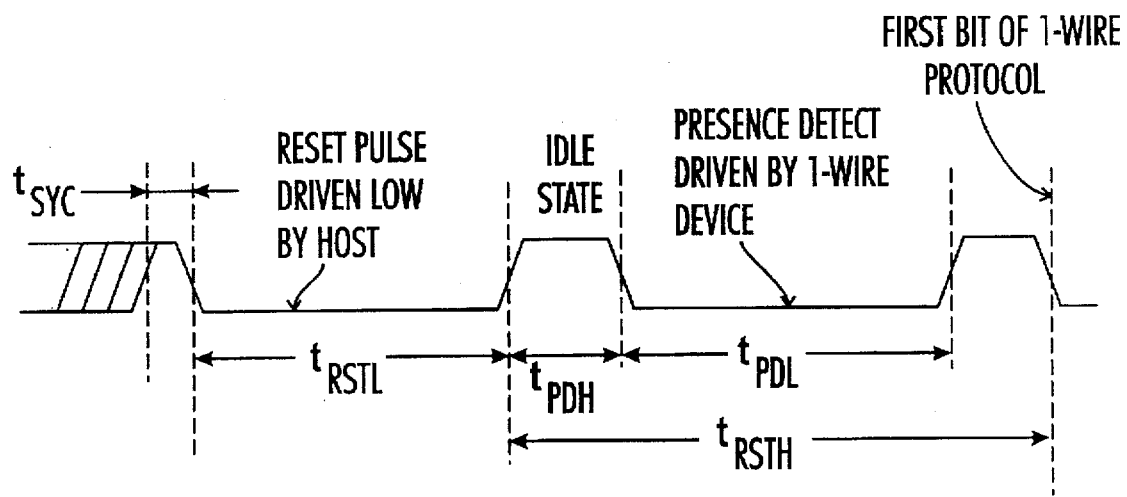
FIG. 5 represents the sequence and logic levels during generation of a reset pulse signal by the device decoder and generation of presence detect signal by the battery pack encoder.

A reset pulse generator 35 is used to provide a battery pack control signal in the form of reset pulses to encoder 65 of battery pack 60, as shown on FIG. 5. This allows encoder 65 to progress in an organized sequence from an initial reset condition to a condition where it can receive control signals from decoder 30 and then communicate battery identification data, including the type number, the battery identification code, and the check value, such states of encoder 65 being illustrated on FIG. 4. A command word generator 36 is also included in decoder 30 to generate other necessary control signals from the system to encoder 65.

A type number decoder/comparator module 37 receives the type number from encoder 65 and makes the necessary comparisons to a pre-programmed type number stored in module 37, which in the preferred embodiment is the hexadecimal number 01. Battery identification code comparator module 39, also part of decoder 30, receives the battery identification code from encoder 65 and makes a comparison of the battery identification code to a device identification code stored in device code memory module 38. Code comparator module 39 also provides a comparison signal to interrupt signal generator 40 to indicate whether there has been a proper match of the battery identification code with the device identification code. If the comparison signal from code comparator module 39 indicates a code mismatch, interrupt signal generator 40 then sends a power interrupt signal to interrupt switch 50. This causes interrupt switch 50 to open, thereby disabling electrical connection of device power supply 20 to battery pack 60.

Optionally, a device identification code input port 43 is provided on decoder 30 whereby a new or changed device identification code can be downloaded to code memory module 38. Finally, an error detection module 42 is optionally provided in a preferred embodiment. Error detection module 42 provides the means for generating an error detection signal, receiving the check value signal from encoder 65, and for making the appropriate comparison to confirm whether the data from encoder 65 has been received correctly by encoder 30.

Having described the basic functional components and modules of the system of the present invention, the electrical operation of a preferred embodiment of the system can now be understood. When a battery pack 60 is initially installed within battery housing 15 of device 10 and mechanical and electrical connection is made between positive, negative, and data terminals 61, 62, and 66 of battery pack 60 and positive, negative, and data contacts 16, 17, and 18 of battery housing 15, decoder/control unit 30 is powered up. A reset pulse is then generated by reset pulse generator 35 of decoder 30 and sent to encoder 65 of battery pack 60, placing the encoder in the first or reset state shown on FIG. 4. Encoder 65 then generates a presence detect signal, as shown on FIG. 5, so that decoder 30 can determine that the battery pack 60 and encoder 65 have been electrically connected. Encoder 65 then assumes the second state shown on FIG. 4.

Figure 2A:
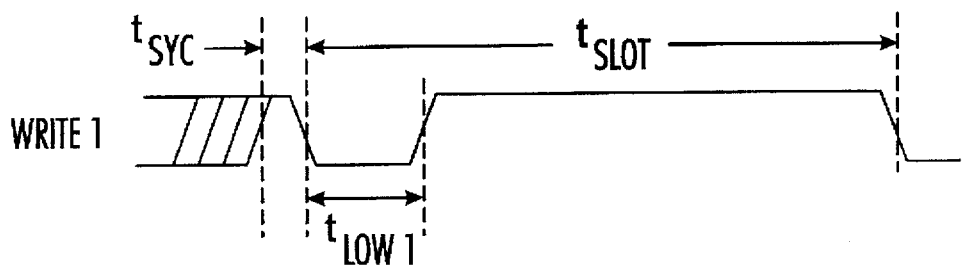
FIGS. 2a and 2b are graphical representations of the signal levels and signal timing associated with the communication of control signals from the system decoder to the battery pack encoder in a preferred embodiment of the system, where $t_{syc}$ represents the synchronization signal, $t_{low1}$ represents the low logic signal for a write 1 time slot, $t_{low0}$ represents the low logic signal for a write 0 time slot, and $t_{slot}$ represents the duration of a single write time slot.
Figure 2B:
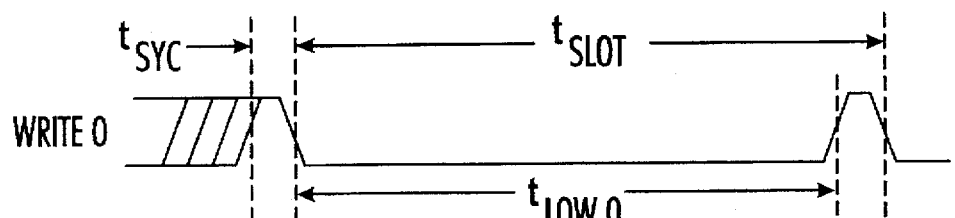
Figure 3A:
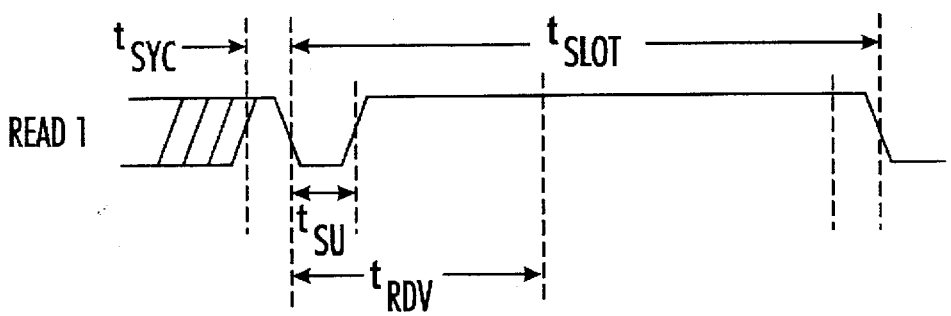
FIGS. 3a and 3b are graphical representations of the signal levels and signal timing associated with communication of battery identification data from the battery pack encoder to the system decoder, where $t_{syc}$ represents the synchronization signal, $T_{SU}$ represents the read data setup signal, $t_{RDV}$ represents the read data valid signal, and $t_{slot}$ represents the duration of a single read time slot.
Figure 3B:
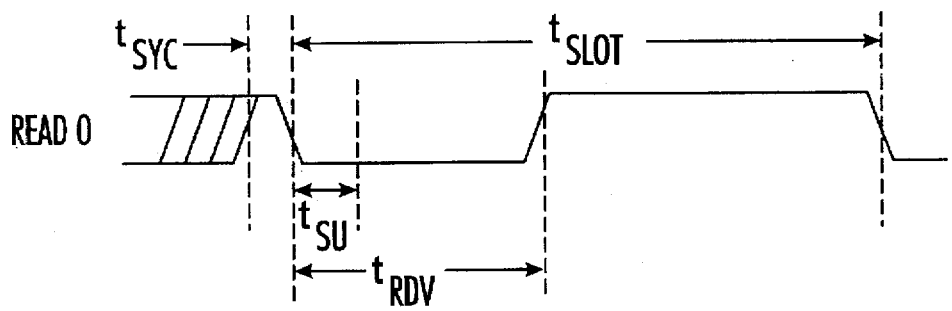

Next, command word generator 36 of decoder 30 transmits a command word battery pack control signal to encoder 65, consisting of eight write time slots as illustrated in FIGS. 2a and 2b. In a preferred embodiment, the command word for encoder 65 is the hexadecimal number 0F. Upon receipt of the proper command word, encoder 65 assumes the third state as shown on FIG. 4. Accordingly, encoder 65 generates the first portion of the battery identification data, consisting of the type number, in eight read time slots as shown on FIGS. 3a and 3b. Type number decoder/comparator module 37 of decoder 30 compares the transmitted type number to its internally stored number and, if a match is confirmed, causes decoder 30 to issue forty-eight read time slot control signals to encoder 65. This causes encoder 65 to transmit the forty-eight bit battery identification code to code comparator module 39 of decoder 30. Where error detection is required, encoder 65 will then transmit a preprogrammed eight bit error check value, which has been calculated based on the type number and the battery identification code. To read this value, error detection module 42 of decoder 30 must issue eight read time slots. Error detection module 42 internally generates an error detection code by making a calculation based on all of the bytes of information that have been passed to decoder 30 from encoder 65.

Upon confirmation that the transmission of battery identification data from encoder 65 has been error free, code comparator module 39 of decoder 30 makes a digital comparison between the received battery identification code and the device identification code which has been retrieved from code memory module 38. If a match is confirmed, code comparator module 39 generates a signal for interrupt signal generator 40. A power interrupt signal then is available at power interrupt signal port 33 for electrical communication to power interrupt switch 50. Power interrupt switch 50 then closes, allowing the delivery of electrical power from battery pack 60 to device power supply 20.

It will also be apparent from FIG. 6 that if a mismatch regarding the type number is determined by type number module 37, a mismatch signal can be transmitted to interrupt signal generator 40, causing power interrupt switch 50 to open.

Although operation of the system has been described with reference to a preferred embodiment which uses a specific encoder device 65, it will be apparent to those skilled in the art that the types, format, and sequence of the battery identification data generated by encoder 65 can vary depending on the precise nature of the device used for encoder 65. Accordingly, the functional modules and sequence of operations of decoder 30 can be varied, in conventional manner known to those skilled in the art, to properly receive and process re-structured or re-sequenced battery identification data from battery pack 60.

Also, the system as described provides for battery power during testing of the battery to be derived directly from the battery to be interrogated. It would also be possible, without departing from the scope and spirit of the invention as claimed, to have a separate source of power to drive decoder 30. In addition, depending on the preferences of the manufacturer of device 10, power interrupt switch 50 can be configured in a normally closed mode, to be opened if a mismatch occurs, or in a normally open mode, to be closed if a battery match is established.

Thus, although there have been described particular embodiments of the present invention of a new and useful battery identification and power interrupt system, it is not intended that such references be construed as limitations upon the scope of this invention except as set forth in the following claims. Further, although there have been described certain data structures and formats used in the preferred embodiment, it is not intended that such be construed as limitations upon the scope of this invention except as set forth in the following claims.

What I claim is:

1. A power interrupt system for matching a battery to a battery powered device, the system comprising:

a. battery housing means for retaining the battery such that the battery is housed separately from other components of the device, said battery housing including positive, negative and data contact means for electrically contacting battery power and battery data terminals;

b. power interrupt means to enable and disable the flow of electrical current from at least one of said battery power contacts to the device, said power interrupt means switchable between a closed position and an open position in response to a power interrupt signal;

c. device memory means in the device for storing a device identification code;

d. decoder means to electrically receive a battery identification code through said battery data contact and to compare the battery identification code to said device identification code stored in said memory means; and e. means for generating said power interrupt signal to interrupt power to said device when the battery identification code does not match said device identification code.

2. The system of claim 1 where said decoder means further comprises an input port for electrically receiving said device identification code from a source external to said device.

3. The system of claim 1, said decoder means comprising control signal means for generating and communicating battery encoder control signals to said data contact means.

4. The system of claim 1 wherein said device memory means includes means for storing the device identification code in digitized format and said decoder means includes means for decoding and comparing the battery identification code in digital format.

5. The system of claim 4 further comprising error detection means to detect data transmission errors in the battery identification code received by said decoder means.

6. The system of claim 5, said control signal means including means to generate a battery reset signal.

7. A battery identification and power interrupt system for a battery powered electrical device comprising:

a. a battery pack, said battery pack removable from other components of the device and including a battery cell and a battery encoder means for electrically storing and communicating battery identification data from said battery pack to the battery powered device, the battery identification dam including a battery identification code;

b. decoder means integral to the battery powered device for receiving the battery identification data, said decoder means further including means for decoding the battery identification code, means for comparing the battery identification code to a device identification code associated with said device, and means for generating an interrupt control signal in response to comparison of the battery identification code to the device identification code; and c. power interrupt means for enabling and disabling operation of the device, said power interrupt means responsive to said interrupt control signal.

8. A battery pack comprising:

a. a battery pack enclosure;

b. positive and negative terminals on said enclosure;

c. a data terminal on said enclosure;

d. at least one battery cell internal to said enclosure and electrically connected to said positive and negative terminals;

e. encoder means integral to said battery pack for electrical communication of battery pack identification data to said data terminal;

f. said enclosure physically isolates said battery cell and;

g. said data terminal being integral with either of said positive or negative terminals.

9. The battery pack of claim 8, said encoder means further comprising memory means for electronically storing a digitized battery identification code.

10. The battery pack of claim 9, said encoder means further comprising means to receive and respond to battery control signals from said data terminal.

* * * * *